United States Patent [19]

Moser et al.

[11] 4,213,897
[45] Jul. 22, 1980

[54] DISAZO AND TRISAZO COMPOUNDS HAVING A 3-PYRIDINIUM OR SUBSTITUTED PYRIDINIUM-4-METHYL-6-HYDROXYPYRIDONE-2 COUPLING COMPONENT RADICAL

[75] Inventors: Helmut Moser, Oberwil; Hans R. von Tobel, Riehen, both of Switzerland

[73] Assignee: Sandoz Ltd., Basel, Switzerland

[21] Appl. No.: 884,413

[22] Filed: Mar. 8, 1978

[30] Foreign Application Priority Data

Mar. 14, 1977 [CH] Switzerland .................. 3158/77

[51] Int. Cl.² ............ C09B 35/20; C09B 35/22; C09B 35/24; C09B 35/32
[52] U.S. Cl. .................. 260/154; 260/146 R; 260/146 D; 260/146 T; 260/147; 260/153; 260/156
[58] Field of Search .......... 260/146 R, 146 D, 146 T, 260/147, 153, 154, 156

[56] References Cited

U.S. PATENT DOCUMENTS

3,852,261  12/1974  Steinemann .................. 260/156

FOREIGN PATENT DOCUMENTS

| | | | |
|---|---|---|---|
| 1924770 | 11/1970 | Fed. Rep. of Germany | 260/156 |
| 2627680 | 1/1977 | Fed. Rep. of Germany | 260/156 |
| 2657147 | 6/1977 | Fed. Rep. of Germany | 260/156 |
| 506595 | 6/1971 | Switzerland | 260/156 |
| 1297116 | 11/1972 | United Kingdom | 260/146 |
| 1377612 | 12/1974 | United Kingdom | 260/156 |

*Primary Examiner*—Floyd D. Higel
*Attorney, Agent, or Firm*—Gerald D. Sharkin; Richard E. Vila; Melvyn M. Kassenoff

[57] ABSTRACT

Sulfo group-free basic disazo and trisazo dyes of the formula

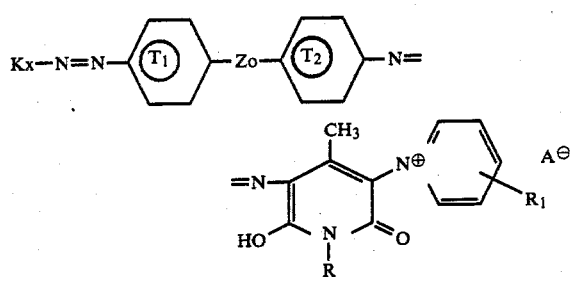

wherein
R is hydrogen; unsubstituted $C_{1-4}$alkyl; $C_{2-4}$-alkyl monosubstituted by hydroxy, the hydroxy being on other than the α-carbon atom; di-($C_{1-4}$alkyl)amino or —$(CH_2)_n$Ko,
$R_1$ is hydrogen, $C_{1-4}$alkyl, $C_{1-4}$hydroxyalkyl or $C_{1-4}$alkoxy,
n is 2 or 3,
Ko is —$N(CH_3)_2$, —$N^\oplus(CH_3)_3 A^\ominus$, —$N^\oplus(CH_3)_2CH_2CH_2OH\ A^\ominus$ or

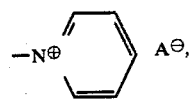

each $A^\ominus$ is an anion,
Zo is a direct bond or a bridging group, and
Kx is a radical of a coupling component of the pyrazolone-5,5-aminopyrazole, β-naphthol, α-naphthol, aniline, phenol or acetoacetylphenylamide series or the radical of barbituric acid, dimedone or a dimedone carboxylic acid ester, which compounds, where Kx is a radical of a coupling component of the pyrazolone-5,5-aminopyrazole, β-naphthol, α-naphthol, aniline, phenol or acetoacetylphenylamide series, contain 1, 2 or 3 basic groups or, where Kx is the radical of barbituric acid, dimedone or a dimedone carboxylic acid ester, contain 1 or 2 basic groups, their production and use in dyeing cationic dyeable substrates, especially paper.

51 Claims, No Drawings

DISAZO AND TRISAZO COMPOUNDS HAVING A 3-PYRIDINIUM OR SUBSTITUTED PYRIDINIUM-4-METHYL-6-HYDROXYPYRIDONE-2 COUPLING COMPONENT RADICAL

The invention relates to disazo and trisazo basic compounds.

The invention provides sulpho group-free basic disazo and trisazo dyes of formula Io,

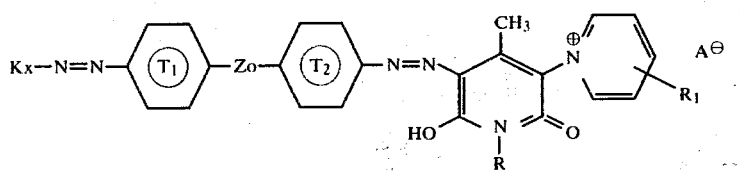

wherein
R is hydrogen; unsubstituted $C_{1-4}$alkyl; $C_{2-4}$-alkyl monosubstituted by hydroxy, the hydroxy being on other than the α-carbon atom; di-($C_{1-4}$) amino or —(CH$_2$)$_n$Ko, $R_1$ is hydrogen; $C_{1-4}$alkyl, unsubstituted or monosubstituted by hydroxy; or unsubstituted $C_{1-4}$alkoxy, n is 2 or 3, Ko is —N(CH$_3$)$_2$, —N$^⊕$(CH$_3$)$_3$ A$^⊖$, —N$^⊕$(CH$_3$)$_2$CH$_2$CH$_2$OH A$^⊖$ or

each A$^⊖$ is an anion,

Zo is a direct bond or a bridging group, and

Kx is a radical of a coupling component of the pyrazolone-5, 5-aminopyrazole, β-naphthol, α-naphthol, aniline, phenol or acetoacetylphenylamide series or the radical of barbituric acid, dimedone or a dimedone carboxylic acid ester, which compounds, where Kx is a radical of a coupling component of the pyrazolone-5, 5-aminopyrazole, β-naphthol, α-naphthol, aniline, phenol or acetoacetylphenylamide series, contain 1, 2 or 3 basic groups or, where Kx is the radical of barbituric acid, dimedone or of a dimedone carboxylic acid ester, contain 1 or 2 basic groups.

Where Zo is a bridging group, such may be any of the conventional bridging groups in the disazo or trisazo direct dye art. Numerous examples of such bridging groups are given hereinafter.

In the compounds of formula Io, rings $T_1$ and $T_2$ may be substituted by any substituent conventional in the art, e.g. by halogen, alkyl or alkoxy.

As will be appreciated, where Kx is a coupling component radical of the pyrazoline-5, 5-aminopyrazole, β-naphthol, α-naphthol, aniline, phenol or acetoacetylphenylamide series, such may bear a basic group, for example a dimethylamino, trimethylammonia, dimethyl-2-hydroxyethyl-ammonium or pyridinium group, e.g. bound to a carbon atom of a bridging group attached to the aromatic or heterocyclic radical of the coupling component. In the case of a 3-methylpyrazolone-5 coupling component, the basic group, e.g. an amino or quaternary ammonium group, may be bound through a single carbon atom to the 1-N-atom.

Preferred compounds of the invention are the compounds of formula I,

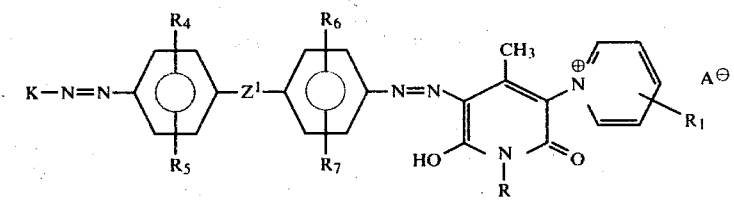

wherein

R, $R_1$ and A$^⊖$ are as defined above, each of $R_4$, $R_5$, $R_6$ and $R_7$, independently, is hydrogen, halogen, unsubstituted $C_{1-4}$alkyl or unsubstituted $C_{1-4}$alkoxy, a maximum of two being halogen and a maximum of two being selected from alkyl and alkoxy, Z is a direct bond ($Z_1$), straight or branched $C_{1-4}$-alkylene($Z_2$), —CO—($Z_3$), —NHCSNH—($Z_4$), —S—($Z_5$), —O—($Z_6$), —CH=CH—($Z_7$), —S—S—($Z_8$), —SO$_2$—($Z_9$), —NH—($Z_{10}$), —NHCO—($Z_{11}$), —CONH—($Z_{12}$), —N(CH$_3$)—CO—($Z_{13}$), —CON(CH$_3$)—($Z_{14}$),

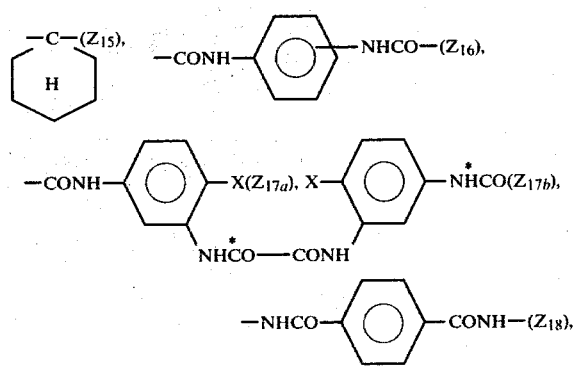

$$-SO_2NH-\bigcirc-NHSO_2-(Z_{20}),$$

$-N(R_8)CO+CH_2+_mCON(R_8)-(Z_{21})$, $-N(R_8)CO-CH=CH-CON(R_8)-(Z_{22})$, $-N(R_8)-CO-N(R_8)-(Z_{23})$, $-CONHNHCO-(Z_{24})$, $-CH_2CONHNHCOCH_2-(Z_{25})$, $-CH=CH-CONHNHCO-CH=CH-(Z_{26})$, $$-N\underset{CH_2CH_2}{\overset{CH_2CH_2}{\diagup\diagdown}}N-(Z_{27}),$$

$$-OCON\underset{CH_2CH_2}{\overset{CH_2CH_2}{\diagup\diagdown}}N-COO-(Z_{28}), -C\underset{O}{\overset{N-N}{\diagup\diagdown}}C-(Z_{29}),$$

$\overset{*}{-}O-CO-O-(Z_{30})$, $-CO\overset{*}{O}-(Z_{31a})$, $-O-CO-(Z_{31b})$, $-COCO-(Z_{32})$, $-O+CH_2+_mO-(Z_{33})$, $$-N(R_8)-C\underset{N}{\overset{N}{\diagup\diagdown}}C-N(R_8)-(Z_{34}),$$
$$\underset{Y}{\overset{|}{C}}$$

$$-O-C\underset{N}{\overset{N}{\diagup\diagdown}}C-O-(Z_{35}),$$
$$\underset{Y}{\overset{|}{C}}$$

$-CON(R_8)+CH_2+_mN(R_8)CO-(Z_{36})$, $-CON(R_8)+CH_2+_mO+CH_2+_mN(R_8)CO-(Z_{37})$, $-CON(R_8)+CH_2+_mN(CH_3)+CH_2+_mN(R_8)CO-(Z_{38})$, $-CON(R_8)+CH_2+_mO+CH_2+_mO+CH_2+_mN(R_8)CO-(Z_{39})$ or $-N=N-(Z_{40})$, wherein
* indicates atom bound to the marked 1-position,
each $R_8$, independently, is hydrogen or straight chain unsubstituted $C_{1-4}$alkyl,
each
m, independently, is 1, 2, 3 or 4,
X is halogen or a straight chain unsubstituted $C_{1-4}$alkyl or $C_{1-4}$alkoxy group, and
Y is halogen, $-NHCH_2CH_2OH$ or $-N(CH_2CH_2OH)_2$,
K is a coupling component radical of barbituric acid or a radical of one of the formulae (II) to (XIV), (II) (III)

-continued (IV) (V)

(VI) (VII)

(VIII) (IX)

(X) (XI)

(XII) (XIII)

(XIV)

wherein n' is 2 or 3, $R_9$ is $-CH_3$ or $-CONH-(CH_2)_{n°}Ko$, n° being 2 or 3, $R_{10}$ is H, unsubstituted phenyl or

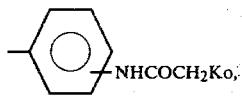

$R_{12}$ is unsubstituted $C_{1-4}$alkyl,
$R_{11}$ is a radical of formulae (XV) to (XXI),

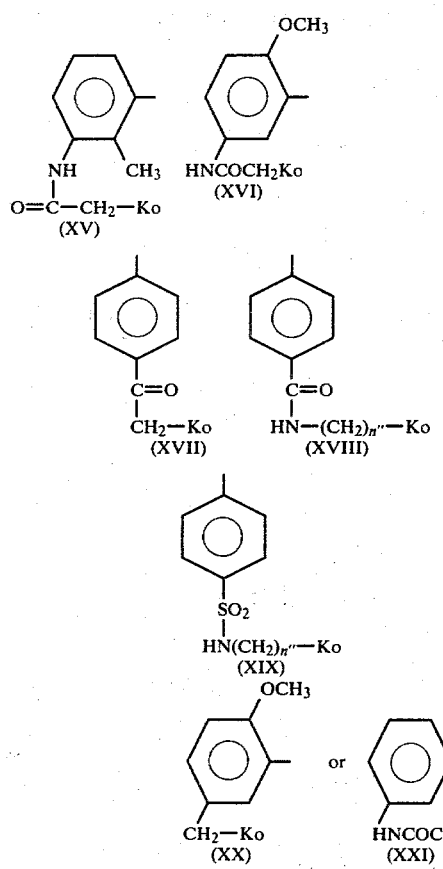

wherein
n" is 2 or 3,
each Ko, independently, is as defined above, and
each $A^\ominus$, independently, is as defined above.

In the compounds of formula Io or I, any unsubstituted $C_{1-4}$-alkyl as R is preferably methyl or ethyl. Any hydroxy substituted alkyl as R is preferably 2-hydroxyethyl or 2-hydroxyisopropyl, more preferably the former. Any —$(CH_2)_n$—Ko group as R is preferably —$(CH_2)_n$—$N(CH_3)_2$ or —$(CH_2)_n$—$N^\oplus(CH_3)_3$, especially where n, therein, is 3. The di-$(C_{1-4}$alkyl)amino significance of R is not particularly preferred.

Thus, the preferred significance of R is Ra, i.e. hydrogen, methyl, ethyl, 2-hydroxyethyl, 2-hydroxyisopropyl, —$(CH_2)_n$—$N(CH_3)_2$ or —$(CH_2)_n$—$N(CH_3)_3A^\ominus$, more preferably Rb, i.e. hydrogen, 2-hydroxyethyl, —$(CH_2)_3$—$N(CH_3)_2$ or —$(CH_2)_3$—$N^\oplus(CH_3)_3A^\ominus$.

Any unsubstituted $C_{1-4}$alkyl as $R_1$ is preferably methyl. Any unsubstituted $C_{1-4}$alkoxy as $R_1$ is preferably methoxy. The hydroxy substituted alkyl significance as $R_1$ is not particularly preferred.

Thus, the preferred significance of $R_1$ is $R_{1a}$, i.e. hydrogen, methyl or methoxy, the more preferred significance being $R_{1b}$, i.e. hydrogen or methyl.

Any halogen as any of $R_4$ to $R_7$ is preferably chlorine, any $C_{1-4}$alkyl is preferably methyl and any $C_{1-4}$alkoxy is preferably methoxy.

$R_5$ is preferably hydrogen.
$R_7$ is preferably hydrogen.

$R_4$ and $R_6$ are preferably $R_{4a}$ and $R_{6a}$, respectively, i.e. the same and hydrogen, chlorine, methyl or methoxy. Most preferably $R_4$ and $R_6$ are both hydrogen.

Of the significances $(Z_1)$ to $(Z_{40})$ of Z, the preferred individual significances are $Z_1$, $Z_2$, $Z_5$ to $Z_7$, $Z_{10}$ to $Z_{14}$, $Z_{16}$, $Z_{17a}$, $Z_{17b}$, $Z_{18}$, $Z_{21}$ to $Z_{24}$, $Z_{27}$ to $Z_{29}$, $Z_{32}$, $Z_{34}$ and $Z_{36}$, of which $Z_1$, $Z_{11}$ to $Z_{14}$, $Z_{16}$, $Z_{21}$, $Z_{22}$, $Z_{29}$ and $Z_{34}$ are particularly preferred. In the significances $Z_{16}$, the phenyl substituents are preferably para to one another.

Z is preferably Za, more preferably Zb; Za and Zb being hereinafter defined.

Any alkyl as $R_8$ is preferably methyl. Thus, the preferred significances of $R_8$ are hydrogen and methyl.

Any halogen as X or Y is preferably chlorine.
Any alkyl as X is preferably methyl and any alkoxy is preferably methoxy. X is preferably chlorine, methyl or methoxy. Y is preferably Y', i.e. chlorine, —$NHCH_2CH_2OH$ or —$N(CH_2CH_2OH)_2$.

Of the radicals of formulae II to XIV as K, the preferred radicals are those of formulae IV, V, VI, VIII, X, XI and XII. In the radical of formula IV, $R_{10}$ is preferably W, i.e. hydrogen or

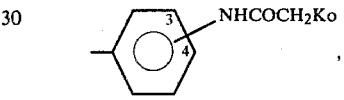

in which latter radical the substituent is in the 3- or 4-position of the phenyl radical. Hydrogen is the lesser preferred significance of W. In the radical of formula XI, $R_{11}$ is preferably $R_{11a}$, i.e. a radical of formula XVI, XVIII, XX or XXI, more preferably $R_{11b}$, i.e. a radical of formula XVI in which Ko is Ko' as hereinafter defined, XVIII in which n is 3 and Ko' is as hereinafter defined, or XXI in which Ko is Ko' as hereinafter defined.

In the compounds of formula I, each of n, n', n° and n", independently of each other, is preferably 3. Ko is preferably Ko', i.e. —$N^\oplus(CH_3)_3A^\ominus$, —$^\oplus N(CH_3)_2CH_2CH_2OH$ $A^\ominus$ or

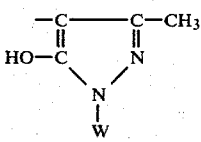

The preferred significance of K is $K_1$, i.e. a coupling component radical of barbituric acid, a radical of formula V, VI, VIII, X or XIII, a radical of the formula

wherein W is as defined above,
or a radical of the formula $CH_3$—CO—CH—CO—$NHR_{11a}$,
where $R_{11a}$ is as defined above.

The more preferred significance of K is $K_1'$, i.e. a coupling component radical of barbituric acid, a radical of formula V or XIII, a radical of formula XXIV,

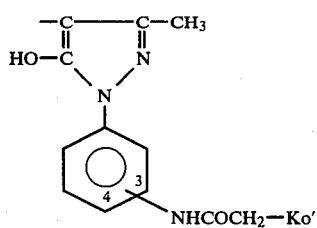

in which
the radical $-NHCOCH_2-Ko'$ is in the 3- or 4-position, and
$Ko'$ is as defined above,
or a radical of the formula

in which $R_{11b}$ is as defined above.

The exact nature of the anion $A^\ominus$ is not critical and the anion may be any conventional in the cationic dyestuff art. The non-chromophoric anions are preferred and as examples may be given the halide, such as chloride or bromide, sulphate, bisulphate, methylsulphate, aminosulphonate, perchlorate, benzenesulphonate, oxalate, maleinate, acetate, propionate, lactate, succinate, tartrate, malate, methanesulphonate, and benzoate ions, complex anions such as of chlorozinc double salts, and the anions of boric, citric, glycolic, diglycolic and adipic acids.

Representative groups of compounds of formula I include those wherein (i) any halogen is chlorine, (ii) z is selected from $Z_1$, $Z_2$, $Z_5$–$Z_7$, $Z_{10}$–$Z_{14}$, $Z_{16}$, $Z_{17a}$, $Z_{17b}$, $Z_{18}$, $Z_{21}$–$Z_{24}$, $Z_{32}$ and $Z_{36}$, (iii) Z is selected from $Z_{27}$–$Z_{29}$ and $Z_{34}$, (iv) R is hydrogen, $C_{1-4}$alkyl or $C_{2-4}$alkyl monosubstituted by hydroxy, (V) R is di-($C_{1-4}$alkyl)amino, (vi) R is $-(CH_2)_n-Ko$, (vii) K is a barbituric acid coupling component radical, (viii) K is a radical of formula II, III, IV, V or VI, (ix) K is a radical of formula II, V or IV, wherein $R_{10}$ is hydrogen or phenyl, (x) K is a radical of formula III, VI or IV, wherein $R_{10}$ is

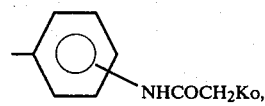

(xi) K is a radical of formula VII, VIII, IX, X or XII, (xii) K is a radical of formula XI, (xiii) K is a radical of formula XIII or XIV, (xiv) each Ko is $-N(CH_3)_2$, (xv) each Ko is $-N^\oplus(CH_3)_3 A^\ominus$ or $-N^\oplus(CH_3)_2CH_2CH_2OH A^\ominus$ and (xvi) each Ko is

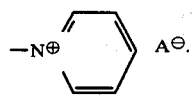

As a preferred class of compounds of formula I may be given the compounds of formula I',

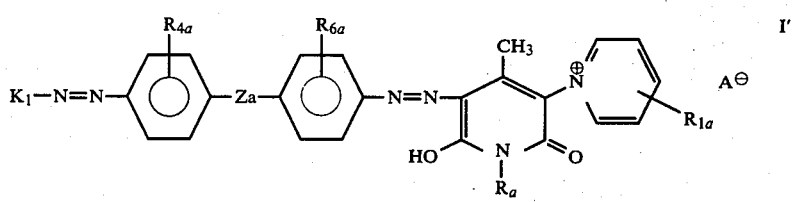

in which
$R_a$, $R_{1a}$, $R_{4a}$, $R_{6a}$ and $K_1$ are as defined above, and
$Za$ is $Z_1$, $Z_5$, $Z_6$, $Z_7$, $Z_{10}$, $Z_{11}$, $Z_{12}$, $Z_{13}$, $Z_{14}$, $Z_{18}$, $Z_{24}$, $Z_{27}$, $Z_{28}$, $Z_{29}$, $Z_{32}$, as defined above, or $-NHCONH-(Z_{41})$,

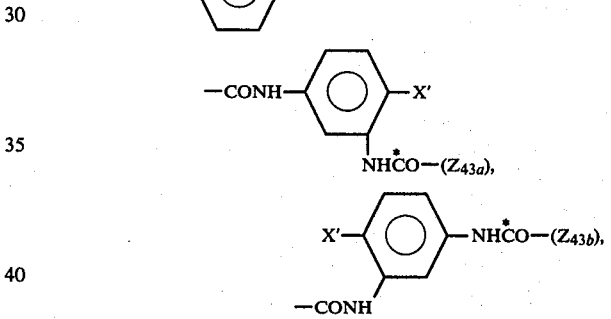

$-NHCOCH_2CH_2CONH-(Z_{44})$, $-NHCOCH=CHCONH-(Z_{45})$, $-NHCO(CH_2)_4-CONH-(Z_{46})$, $-N(CH_3)COCH_2CH_2CON(CH_3)-(Z_{47})$, $-N(CH_3)COCH=CHCON(CH_3)-(Z_{48})$, $-N(CH_3)CON(CH_3)-(Z_{49})$,

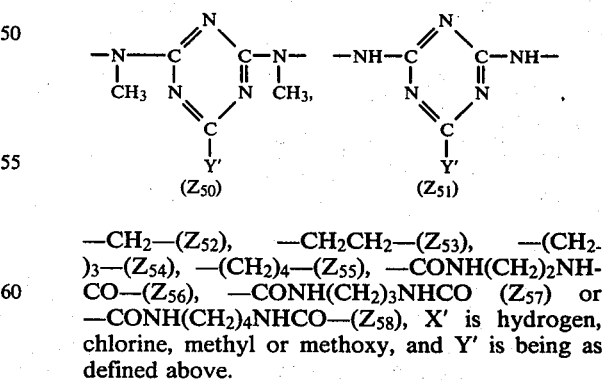

$-CH_2-(Z_{52})$, $-CH_2CH_2-(Z_{53})$, $-(CH_2)_3-(Z_{54})$, $-(CH_2)_4-(Z_{55})$, $-CONH(CH_2)_2NHCO-(Z_{56})$, $-CONH(CH_2)_3NHCO$ $(Z_{57})$ or $-CONH(CH_2)_4NHCO-(Z_{58})$, X' is hydrogen, chlorine, methyl or methoxy, and Y' is being as defined above.

Representative groups of compounds of formula I' include those wherein (i) Ra is hydrogen, methyl, ethyl, 2-hydroxyethyl or 2-hydroxyisopropyl, (ii) Ra is $-(CH_2)_n-N(CH_3)_2$, (iii) Ra is $-(CH_2)_n-N^\oplus(CH_3)_3 A^\ominus$, (iv) $K_1$ is a barbituric acid coupling component radical, (v) $K_1$ is a radical of formula V, (vi) $K_1$ is a radical of formula VI, (vii) $K_1$ is a radical of formula VIII or X, (viii) $K_1$ is a radical of formula XIII, (ix) $K_1$ is a radical of formula XXVIII,

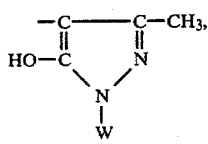 (XXVIII)

(x) $K_1$ is a radical of formula XXVIII wherein W is hydrogen, (xi) $K_1$ is a radical of formula XXVIII wherein W is

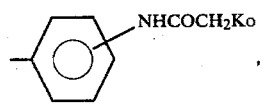

the substituent being in the 3- or 4-position, (xii) $K_1$ is a radical of the formula

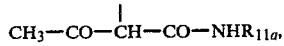

(xiii) Za is other than $Z_{27}$, $Z_{28}$, $Z_{29}$, $Z_{50}$ or $Z_{51}$, (xiv) Za is $Z_{27}$, $Z_{28}$, $Z_{29}$, $Z_{50}$ or $Z_{51}$, (xv) Ko is $-N(CH_3)_2$, (xvi) Ko is $-N^{\oplus}(CH_3)_3$ $A^{\ominus}$ or $-N^{\oplus}(CH_3)_2CH_2CH_2OH$ $A^{\ominus}$ and (xvii) Ko is

As a more preferred class of compounds may be given the compounds of formula I″, (ix) Ko′ is $-N^{\oplus}(CH_3)_3$ $A^{\ominus}$ or $-N^{\oplus}(CH_3)_2CH_2CH_2OH$ $A^{\ominus}$, (x) Ko′ is

(xi) Zb is other than $Z_{29}$ or $Z_{50}$ and (xii) Zb is $Z_{29}$ or $Z_{50}$.

Since benzidine and some of its derivatives are known carcinogens having strict control in many countries on their industrial use, the compounds of the invention which would involve the use of such in their production are, at least from a commercial production standpoint, not particularly preferred. For example, the compounds of formula I″, where Zb is $Z_1$, i.e. a direct bond, are, for this reason, not particularly preferred.

The invention also provides a process for the production of compounds of formula Io, comprising coupling a tetrazo derivative of a diamine of formula XXV,

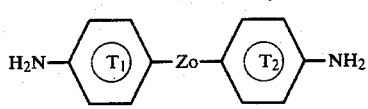 XXV with a coupling component of formula XXVI,

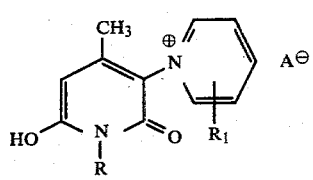 XXVI and with a coupling component of formula XXVII,

H—Kx  XXVII

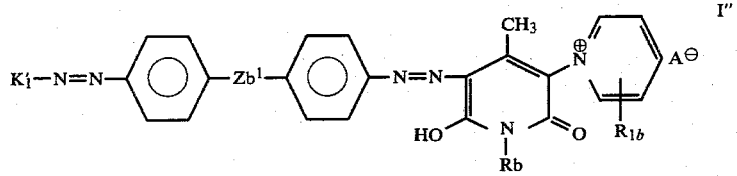 I″ in which
$R_b$, $R_{1b}$ and $K_1'$ are as defined above, and
Zb is $Z_1$, $Z_{11}$, $Z_{12}$, $Z_{13}$, $Z_{14}$, $Z_{29}$, $Z_{42}$, $Z_{44}$, $Z_{45}$, $Z_{46}$, $Z_{47}$, $Z_{48}$, $Z_{50}$, $Z_{53}$ or $Z_{55}$.

Representative groups of compounds of formula I″ include those wherein (i) Rb is hydrogen or 2-hydroxyethyl, (ii) Rb is $-(CH_2)_3-N(CH_3)_2$, (iii) Rb is $-(CH_2)_3-N^{\oplus}(CH_3)_3$ $A^{\ominus}$, (iv) $K_1'$ is a barbituric acid coupling component radical, (v) $K_1'$ is a radical of formula V, (vi) $K_1'$ is a radical of formula XIII, (vii) $K_1'$ is a radical of formula XXIV, (viii) $K_1'$ is a radical of the formula

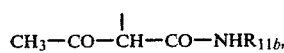

The mol ratio of compound XXV:compound XXVI:compound XXVII is preferably 1:1:1. The coupling is suitably carried out in conventional manner, e.g. in aqueous or aqueous/organic acidic, neutral or basic media at a temperature from about $-10°$ C. to about room temperature, optionally in the presence of a coupling accelerator such as pyridine or urea.

The resulting compounds of formula Io may be isolated and purified in conventional manner. If desired, any anion $A^{\ominus}$, in the compound obtained directly from the process, may be exchanged, employing conventional ion-exchange techniques, for a more desired anion $A^{\ominus}$.

The compounds of formulae XXV, XXVI and XXVII are either known or may be obtained from available starting materials in analogous manner to the known compounds.

The compounds of the invention are cationic dyes and are useful in the dyeing and printing of cationic dyeable substrates.

The compounds may be converted into dye preparations. The processing into stable, liquid dye preparations may take place in a generally known manner, advantageously by dissolving in suitable solvents, optionally with addition of auxiliaries e.g. stabilizers, for example as described in French Pat. No. 1,572,030.

Thus, liquid preparations may, for example, be obtained by dissolving 1 part of 100% dyestuff in the form of the dyestuff base in 1 to 6 parts of an organic carboxylic acid or in a mixture of organic carboxylic acids, and in 1 to 4 parts of water, preferably by dissolving 1 part of dyestuff in 1.5 to 4 parts of an organic acid and in 1.5 to 4 parts of water.

By organic carboxylic acids are to be understood mono-, di- and tri-basic acids, the preferred being monobasic, low molecular weight carboxylic acids, such as formic acid, acetic acid and propionic acid.

Dye Preparation of Example a (of a liquid preparation)

160 Parts of the dyestuff from Example 96 (hereinafter given) as a dyestuff base are dissolved, at 40°–60° C., in 300 parts of acetic acid and 300 parts of water. A stable, clear solution is obtained.

The processing into solid, granulate dye preparations may also take place in a generally known manner, advantageously by granulating in accordance with French Pat. No. 1,581, 900.

The granulate preparations may contain, for example, 1 part of 100% dyestuff, 0.1 to 0.7 parts of an organic carboxylic acid and 0 to 1.5 parts of a solid, non-ionic conventional diluent, preferably 1 part of dyestuff, 0.25 to 0.65 parts of an organic carboxylic acid and 0 to 1.5 parts of diluent.

The organic carboxylic acids used for producing the granulates may be mono-, di- or tri-basic, optionally containing hydroxy groups, but advantageously are mono- or di-basic, low molecular weight, saturated or unsaturated carboxylic acids optionally containing hydroxy groups, such as formic acid, acetic acid, propionic acid, oxalic acid, succinic acid, malonic acid, fumaric acid, lactic acid, malic acid and citric acid.

The solid, non-ionic diluent may, for example, be dextrin or a sugar, such as glucose, fructose or galactose.

The granulates are advantageously produced by atomisation from solutions or suspensions, the solutions or suspensions having the following composition:
  1 part of dyestuff (100%),
  0.1 to 0.7 parts of the organic carboxylic acid,
  0 to 1.5 parts of the non-ionic diluent and
  1.5 to 6 parts of water,
preferably
  1 part of dyestuff (100%),
  0.5 to 0.65 parts of organic carboxylic acid,
  0 to 1.5 parts of diluent and
  2 to 4 parts of water.

Dye Preparation Example b (of a granulate)

160 Parts of the dyestuff from Example 1 (hereinafter given) as dyestuff base and 80 parts of dextrin are dissolved, at 40°–60° C., in 47 parts of lactic acid and 320 parts of water, and the mixture is granulated by known methods.

The compounds of the invention are particularly useful for dyeing paper, e.g. for the production of pulp dyed paper, whether sized or unsized. They can also be used for dyeing preformed paper by the dipping process. Known methods may be employed for both techniques.

The compounds of the invention have good solubility properties in cold water. Furthermore, the back-water from the paper machine is only slightly, if at all, coloured. They do not mottle when dyed on paper and show good insensitivity over a wide pH range. The dyeings on paper are brilliant and have good light fastness properties. After long exposure to light, the shade alters tone-in-tone. The dyed papers show good wet-fastness properties, not only to water, but also to milk, fruit juices, sweetened mineral water and alcoholic beverages. The dyestuffs have high substantivity, i.e. they are taken up almost quantitatively; they may be added directly to the paper pulp, i.e. without firstly dissolving them, in dry powder or granulate form, without reducing the brilliance or colour yield. The dyed papers may be bleached either by oxidation or by reduction, which is important for re-cycling the dyed paper. The dyed papers show good shade stability.

The following Examples, in which all parts and percentages are by weight and the temperatures in degrees Centigrade, further illustrate the invention.

EXAMPLE 1

22.7 Parts of 4,4′-diaminobenzanilide are tetrazotised by known methods at 0°–5° in 500 parts of water containing 55 parts of 30% hydrochloric acid and 13.8 parts of sodium nitrite. 20.2 Parts of 6-hydroxy-4-methyl-pyridonyl-(3)-pyridinium betain base, dissolved in 320 parts of water and 40 parts of acetic acid, are added dropwise with vigourous stirring over the course of 3 hours to the ice-cold tetrazo solution. An orange suspension is obtained. The pH is set at 2.5 by addition of a 5% sodium hydroxide solution. Then, 14 parts of 3-methyl-5-pyrazolone-1-carbamidine, dissolved in 700 parts of water and 160 parts of acetic acid, are added dropwise to the reaction mixture. A pH of 4 is obtained using a sodium hydroxide solution; no diazo group can be detected. The orange suspension is filtered at a pH of 10.5 and is washed with water until neutral. The residue dissolves in a mixture of acetic acid and water in a yellow-orange shade and is the dyestuff of the formula

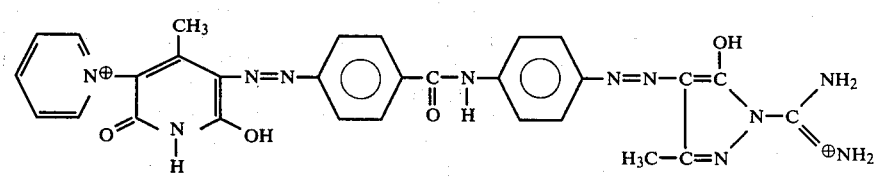

which dyes paper in yellow shades, with good fastness properties.

EXAMPLE 2

By firstly adding 14 parts of 3-methyl-5-pyrazolone-1-carbamidine to the tetrazo compound of Example 1, under the conditions stated therein, and then coupling this, and after the coupling process subsequently coupling 20.2 parts of 6-hydroxy-4-methylpyridonyl-(3)-pyridinium betain base under the conditions given therein, a dyestuff of the formula

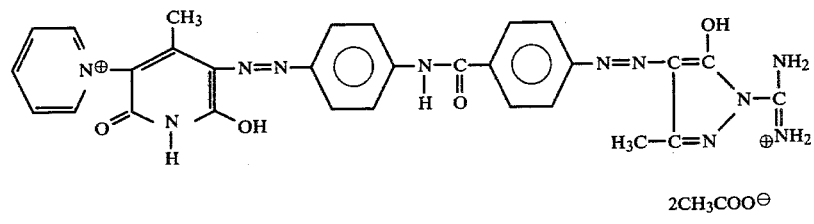

is obtained, which dyes paper in reddish-yellow shades, with good fastness.

DYEING EXAMPLE A

70 Parts of chemically bleached sulphite cellulose (from conifer wood) and 30 parts of chemically bleached sulphite cellulose (from birchwood) are ground in 2000 parts of water in a Hollander. 0.2 Parts of the dyestuff described in Example 1 are sprinkled into this pulp. After mixing for 20 minutes, paper is produced from this pulp. The absorbent paper which is obtained in this way is dyed yellow. The waste water is practically colourless.

DYEING EXAMPLE B 0.5 Parts of the dyestuff from Example 1 are dissolved in 100 parts of hot water and cooled to room temperature. This solution is added to 100 parts of chemically bleached sulphite cellulose which has been ground with 2000 parts of water in a Hollander. After mixing for 15 minutes, sizing takes place. Paper which has been produced from this pulp has a yellow shade of average intensity, with good wet fastness properties.

DYEING EXAMPLE C

A length of absorbent paper which is unsized is drawn through a dyestuff solution of the following composition at 40°–50°:
  0.5 parts of the dyestuff from Example 1
  0.5 parts of starch and
  99.0 parts of water.
The excess dyestuff solution is squeezed out through two rollers. The dried strip of paper is dyed yellow.

Equally good paper dyeings may be obtained by employing in the above Dyeing Examples A, B and C equivalent amounts of the compositions of Dye Preparation Example a (liquid preparation) or Dye Preparation Example b (granulate preparation), hereinbefore given.

In Table I is given the structure of further dyestuffs which may be obtained in accordance with Examples 1 and 2. They correspond to the formula

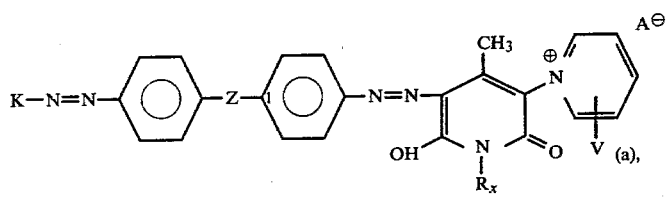

wherein
V signifies hydrogen or —CH$_3$ and
K, Z and R$_x$ have the definitions given in the corresponding columns.

The atom marked * is bound in the 1-position. The anion A$^\ominus$ may be any one of those listed in the foregoing description. The symbol Q$^\oplus$ may be any radical Q$^\oplus$ which is listed in Table A. These groupings may be exchanged in any individual dyestuff for another of the given groupings.

TABLE A

The radical R$_x$ may be any radical R$_x$ which is listed in Table B. These groupings may be exchanged in each dyestuff for another of the given groupings R$_x$.

TABLE B

| No. | |
|---|---|
| 1 | H |
| 2 | —CH$_2$—CH$_2$—OH |
| 3 | —(CH$_2$)$_2$—N(CH$_3$)$_2$ |
| 4 | —(CH$_2$)$_3$—N(CH$_3$)$_2$ |
| 5 | —(CH$_2$)$_3$—$^\oplus$N(CH$_3$)$_3$ A$^\ominus$ |
| 6 | —(CH$_2$)$_2$—$^\oplus$N(CH$_3$)$_3$ A$^\ominus$ |

Since, in formula (a), V can be hydrogen or methyl, each of the following Examples can be regarded as "double" Examples, one set with V as hydrogen, the other with V as methyl.

TABLE I

| Ex. No. | K | Z | $R_x$-No. | Q-No. |
|---|---|---|---|---|
| 3a–3e | ![structure: -C(=C(OH))-N(-C(NH₂)=NH)-N=C-CH₃] | $Z_{11}$ | 2–6 | — |
| 4a–4f | " | $Z_1$ | 1–6 | — |
| 5a–5e | " | $Z_{12}$ | 2–6 | — |
| 6a–6c | " | $Z_{13}$ | 1, 2, 4 | — |
| 7a–7c | " | $Z_{14}$ | 1, 2, 4 | — |
| 8a–8c | " | $Z_{29}$ | 1, 2, 4 | — |
| 9a–9d | " | $Z_{42}$ | 1, 2, 4, 5 | — |
| 10a–10e | " | $Z_{44}$ | 1–5 | — |
| 11a–11e | " | $Z_{45}$ | 1–5 | — |
| 12a–12e | " | $Z_{46}$ | 1–5 | — |
| 13a–13e | " | $Z_{47}$ | 1–5 | — |
| 14a–14e | " | $Z_{48}$ | 1–5 | — |
| 15a–15f | " | $Z_{53}$ | 1–6 | — |
| 16a–16f | " | $Z_{56}$ | 1–6 | — |
| 17a–17f | ![structure: -C(=C(NH₂))-NH-N=C-CH₃] | $Z_{11}$ | 1–6 | — |
| 18a–18f | " | $Z_{12}$ | 1–6 | — |
| 19a–19c | " | $Z_{13}$ | 1, 2, 4 | — |
| 20a–20c | " | $Z_{14}$ | 1, 2, 4 | — |
| 21a–21c | " | $Z_{29}$ | 1, 2, 4 | — |
| 22a–22d | " | $Z_{42}$ | 1, 2, 4, 5 | — |
| 23a–23e | " | $Z_{44}$ | 1–5 | — |
| 24a–24e | " | $Z_{45}$ | 1–5 | — |
| 25a–25e | " | $Z_{46}$ | 1–5 | — |
| 26a–26e | " | $Z_{47}$ | 1–5 | — |
| 27a–27e | " | $Z_{48}$ | 1–5 | — |
| 28a–28f | " | $Z_{53}$ | 1–6 | — |
| 29a–29f | " | $Z_{56}$ | 1–6 | — |
| 30a–30e | ![structure: -C(=C(OH))-NH-N=C-CH₃] | $Z_{11}$ | 2–6 | — |
| 31a–31e | " | $Z_{12}$ | 2–6 | — |
| 32a–32c | " | $Z_{13}$ | 1, 2, 4 | — |
| 33a–33c | " | $Z_{14}$ | 1, 2, 4 | — |
| 34a–34c | " | $Z_{29}$ | 1, 2, 4 | — |
| 35a–35d | " | $Z_{42}$ | 1, 2, 4, 5 | — |
| 36a–36e | " | $Z_{44}$ | 1–5 | — |
| 37a–37e | " | $Z_{45}$ | 1–5 | — |
| 38a–38e | " | $Z_{46}$ | 1–5 | — |
| 39a–39e | " | $Z_{47}$ | 1–5 | — |
| 40a–40e | " | $Z_{48}$ | 1–5 | — |
| 41a–41f | " | $Z_{53}$ | 1–6 | — |
| 42a–42f | " | $Z_{56}$ | 1–6 | — |
| 43a–43e | ![structure: -HC(-C(=O)-NH-CO-NH-C(=O)-) hydantoin-like ring] | $Z_{11}$ | 2–6 | — |
| 44a–44e | " | $Z_{12}$ | 2–6 | — |
| 45a–45c | " | $Z_{13}$ | 1, 2, 4 | — |
| 46a–46c | " | $Z_{14}$ | 1, 2, 4 | — |
| 47a–47c | " | $Z_{29}$ | 1, 2, 4 | — |
| 48a–48d | " | $Z_{42}$ | 1, 2, 4, 5 | — |
| 49a–49e | " | $Z_{44}$ | 1–5 | — |
| 50a–50e | " | $Z_{45}$ | 1–5 | — |
| 51a–51e | " | $Z_{46}$ | 1–5 | — |
| 52a–52e | " | $Z_{47}$ | 1–5 | — |
| 53a–53e | " | $Z_{48}$ | 1–5 | — |
| 54a–54f | " | $Z_{53}$ | 1–6 | — |
| 55a–55f | " | $Z_{56}$ | 1–6 | — |

TABLE I-continued

| Ex. No. | K | Z | $R_x$-No. | Q-No. |
|---|---|---|---|---|
| 56a–56r | (structure: pyrazole with =C−C= bearing NH−CO−CH$_2$−Q$^\oplus$, H$_3$C−C=N, N−H) | $Z_{11}$ | 1–6 | 1–3 |
| 57a–57r | ″ | $Z_{12}$ | 1–6 | 1–3 |
| 58a–58r | ″ | $Z_{13}$ | 1–6 | 1–3 |
| 59a–59r | ″ | $Z_{14}$ | 1–6 | 1–3 |
| 60a–60o | ″ | $Z_{29}$ | 1–5 | 1–3 |
| 61a–61d | ″ | $Z_{42}$ | 1, 2, 3, 6 | 1 |
| 62a–62l | ″ | $Z_{44}$ | 1, 2, 3, 5 | 1–3 |
| 63a–63d | ″ | $Z_{45}$ | 1, 2, 3, 5 | 1 |
| 64a–64d | ″ | $Z_{46}$ | 1, 2, 3, 5 | 2 |
| 65a–65d | ″ | $Z_{47}$ | 1, 2, 4, 5 | 1 |
| 66a–66d | ″ | $Z_{48}$ | 1, 2, 4, 5 | 1 |
| 67a–67r | ″ | $Z_{53}$ | 1–6 | 1–3 |
| 68a–68r | ″ | $Z_{56}$ | 1–6 | 1–3 |
| 69a–69l | (structure: phenyl with NH−CO−CH(COCH$_3$)− at top and CO−NH(CH$_2$)$_3$−Q$^\oplus$ at bottom) | $Z_{11}$ | 1–6 | 1, 4 |
| 70a–70l | ″ | $Z_{12}$ | 1–6 | 1, 4 |
| 71a–71f | ″ | $Z_{13}$ | 1, 2, 4 | 1, 4 |
| 72a–72f | ″ | $Z_{14}$ | 1, 2, 4 | 1, 4 |
| 73a–73f | ″ | $Z_{29}$ | 1, 2, 4 | 1, 4 |
| 74a–74h | ″ | $Z_{42}$ | 1, 2, 4, 5 | 1, 4 |
| 75a–75j | ″ | $Z_{44}$ | 1–5 | 1, 4 |
| 76a–76j | ″ | $Z_{45}$ | 1–5 | 1, 4 |
| 77a–77j | ″ | $Z_{46}$ | 1–5 | 1, 4 |
| 78a–78j | ″ | $Z_{47}$ | 1–5 | 1, 4 |
| 79a–79j | ″ | $Z_{48}$ | 1–5 | 1, 4 |
| 80a–80l | ″ | $Z_{53}$ | 1–6 | 1, 4 |
| 81a–81l | ″ | $Z_{56}$ | 1–6 | 1, 4 |
| 82a–82l | (structure: phenyl with NH−CO−CH(COCH$_3$)− at top and SO$_2$−NH−(CH$_2$)$_3$−Q$^\oplus$ at bottom) | $Z_{11}$ | 1–6 | 1, 4 |
| 83a–83l | ″ | $Z_{12}$ | 1–6 | 1, 4 |
| 84a–84f | ″ | $Z_{13}$ | 1, 2, 4 | 1, 4 |
| 85a–85f | ″ | $Z_{14}$ | 1, 2, 4 | 1, 4 |
| 86a–86f | ″ | $Z_{29}$ | 1, 2, 4 | 1, 4 |
| 87a–87h | ″ | $Z_{42}$ | 1, 2, 4, 5 | 1, 4 |
| 88a–88j | ″ | $Z_{44}$ | 1–5 | 1, 4 |
| 89a–89j | ″ | $Z_{45}$ | 1–5 | 1, 4 |
| 90a–90j | ″ | $Z_{46}$ | 1–5 | 1, 4 |
| 91a–91j | ″ | $Z_{47}$ | 1–5 | 1, 4 |
| 92a–92j | ″ | $Z_{48}$ | 1–5 | 1, 4 |
| 93a–93l | ″ | $Z_{53}$ | 1–6 | 1, 4 |
| 94a–94l | ″ | $Z_{56}$ | 1–6 | 1, 4 |
| 95a–95x | (structure: pyrazolone H$_3$C−C=C−C−OH with N−N, N−phenyl (E)$_3$ at 3,4 positions, NH−CO−CH$_2$−Q$^\oplus$) | $Z_{11}$ | 1–6 | 1–4 |
| 96a–96x | ″ | $Z_{12}$ | 1–6 | 1–4 |
| 97a–97l | ″ | $Z_{13}$ | 1, 2, 4 | 1–4 |
| 98a–98l | ″ | $Z_{14}$ | 1, 2, 4 | 1–4 |
| 99a–99l | ″ | $Z_{29}$ | 1, 2, 4 | 1–4 |
| 100a–100p | ″ | $Z_{42}$ | 1, 2, 4, 5 | 1–4 |

TABLE I-continued

| Ex. No. | K | Z | $R_x$-No. | Q-No. |
|---|---|---|---|---|
| 101a–101t | " | $Z_{44}$ | 1–5 | 1–4 |
| 102a–102t | " | $Z_{45}$ | 1–5 | 1–4 |
| 103a–103t | " | $Z_{46}$ | 1–5 | 1–4 |
| 104a–104t | " | $Z_{47}$ | 1–5 | 1–4 |
| 105a–105t | " | $Z_{48}$ | 1–5 | 1–4 |
| 106a–106x | " | $Z_{53}$ | 1–6 | 1–4 |
| 107a–107x | " | $Z_{56}$ | 1–6 | 1–4 |
| 108a–108x | 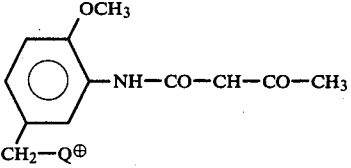 | $Z_{11}$ | 1–6 | 1–4 |
| 109a–109x | " | $Z_{12}$ | 1–6 | 1–4 |
| 110a–110l | " | $Z_{13}$ | 1, 2, 4 | 1–4 |
| 111a–111l | " | $Z_{14}$ | 1, 2, 4 | 1–4 |
| 112a–112l | " | $Z_{29}$ | 1, 2, 4 | 1–4 |
| 113a–113p | " | $Z_{42}$ | 1, 2, 4, 5 | 1–4 |
| 114a–114t | " | $Z_{44}$ | 1–5 | 1–4 |
| 115a–115t | " | $Z_{45}$ | 1–5 | 1–4 |
| 116a–116t | " | $Z_{46}$ | 1–5 | 1–4 |
| 117a–117t | " | $Z_{47}$ | 1–5 | 1–4 |
| 118a–118t | " | $Z_{48}$ | 1–5 | 1–4 |
| 119a–119x | " | $Z_{53}$ | 1–6 | 1–4 |
| 120a–120x | " | $Z_{56}$ | 1–6 | 1–4 |
| 121a–121x | 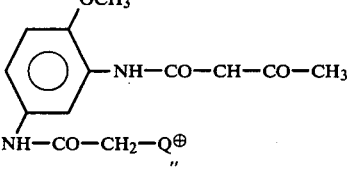 | $Z_{11}$ | 1–6 | 1–4 |
| 122a–122x | " | $Z_{12}$ | 1–6 | 1–4 |
| 123a–123l | " | $Z_{13}$ | 1, 2, 4 | 1–4 |
| 124a–124l | " | $Z_{14}$ | 1, 2, 4 | 1–4 |
| 125a–125l | " | $Z_{29}$ | 1, 2, 4 | 1–4 |
| 126a–126p | " | $Z_{42}$ | 1, 2, 4, 5 | 1–4 |
| 127a–127t | " | $Z_{44}$ | 1–5 | 1–4 |
| 128a–128t | " | $Z_{45}$ | 1–5 | 1–4 |
| 129a–129t | " | $Z_{46}$ | 1–5 | 1–4 |
| 130a–130t | " | $Z_{47}$ | 1–5 | 1–4 |
| 131a–131t | " | $Z_{48}$ | 1–5 | 1–4 |
| 132a–132x | " | $Z_{53}$ | 1–6 | 1–4 |
| 133a–133x | " | $Z_{56}$ | 1–6 | 1–4 |
| 134a–134f | 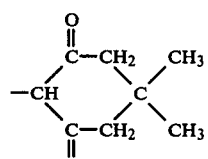 | $Z_{11}$ | 1–6 | — |
| 135a–135f | " | $Z_{12}$ | 1–6 | — |

The radical —NHCOCH$_2$Q$^\oplus$ in Examples 95a to 107x can be in position 3 or 4 of ring E.

The dyes of Examples 3a to 135f all dye paper a yellow shade.

The compounds of Examples 95a, 96a, 97a and 98a wherein the —NH—CO—CH$_2$—Q$^\oplus$ group is in the 4-position have the formulae

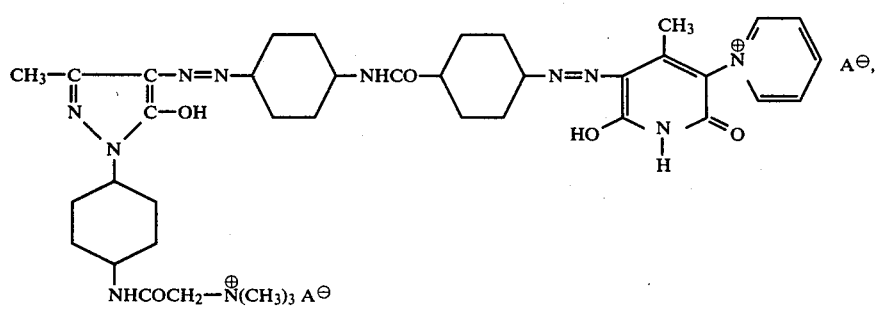

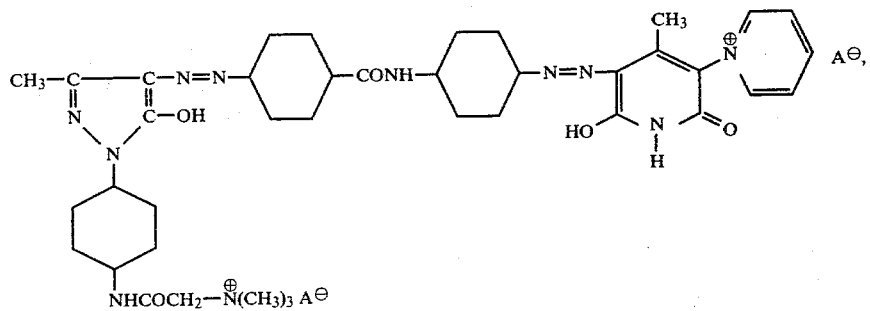
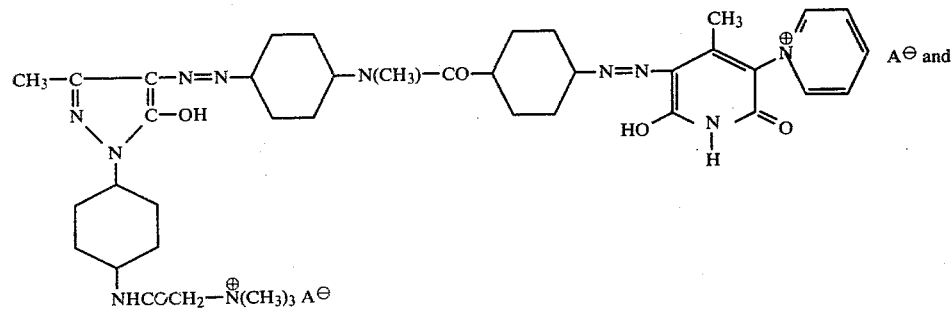
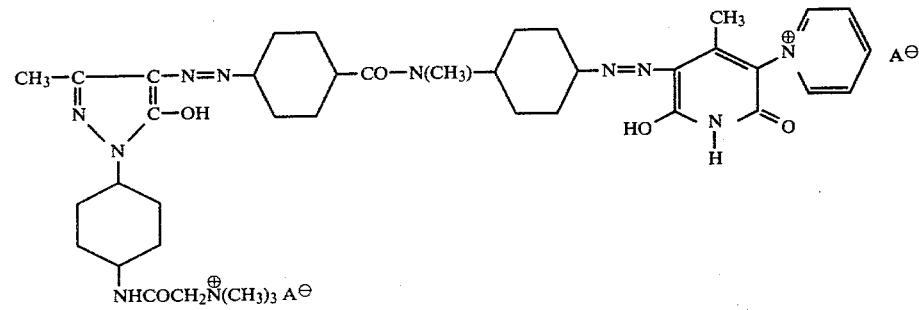
respectively.
What is claimed is:
1. A compound of the formula
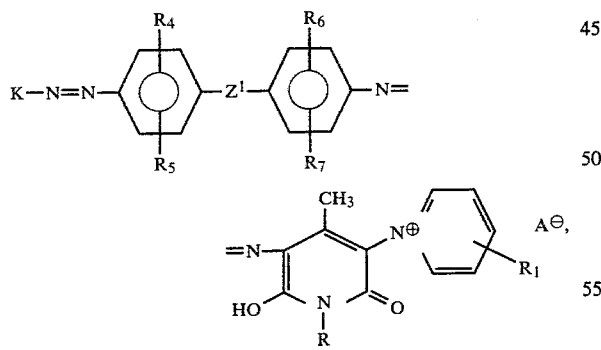
wherein
K is
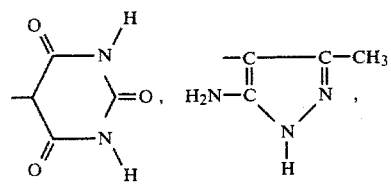
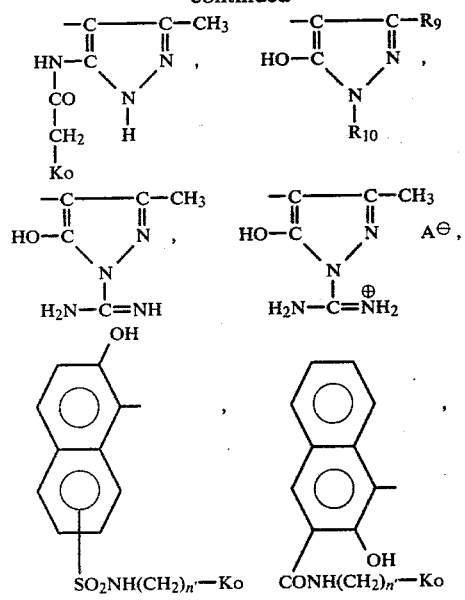

-continued

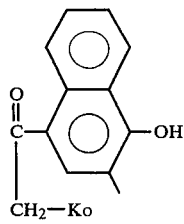 ,  ,

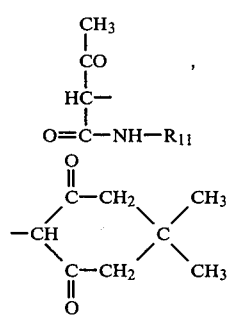 , 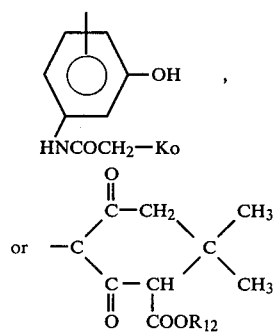 , wherein
R$_9$ is methyl or —CONH—(CH$_2$)$_{n°}$—Ko, wherein n° is 2 or 3,
R$_{10}$ is hydrogen, phenyl or

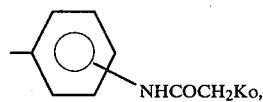

R$_{11}$ is

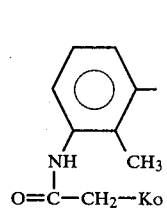 , 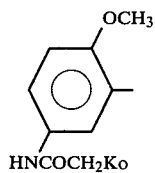 ,

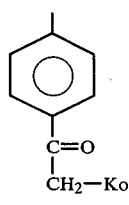 ,

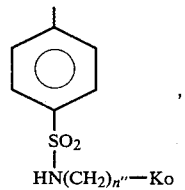 or

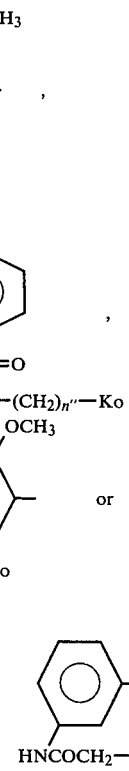

wherein n'' is 2 or 3,
R$_{12}$ is C$_{1-4}$alkyl, and
n' is 2 or 3,
R is hydrogen, C$_{1-4}$alkyl, C$_{2-4}$hydroxyalkyl the hydroxy group of which is on other than the α-carbon atom, di-(C$_{1-4}$alkyl)amino or —(CH$_2$)$_n$—Ko, wherein n is 2 or 3,
R$_1$ is hydrogen, C$_{1-4}$alkyl, C$_{1-4}$hydroxyalkyl or C$_{1-4}$alkoxy,
each of R$_4$, R$_5$, R$_6$ and R$_7$ is independently hydrogen, halo, C$_{1-4}$alkyl or C$_{1-4}$alkoxy, with the proviso that not more than two of R$_4$, R$_5$, R$_6$ and R$_7$ are halo and not more than two of R$_4$, R$_5$, R$_6$ and R$_7$ are selected from C$_{1-4}$alkyl and C$_{1-4}$alkoxy, and
Z is a direct bond, straight or branched C$_{1-4}$alkylene, —CO—, —NHCSNH—, —S—, —O—, —CH═CH—, —S—S—, —SO$_2$—, —NH—, —N*HCO—, —CONH—, —N(CH$_3$)—C*O—, —CON(CH$_3$)—,

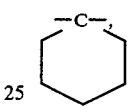

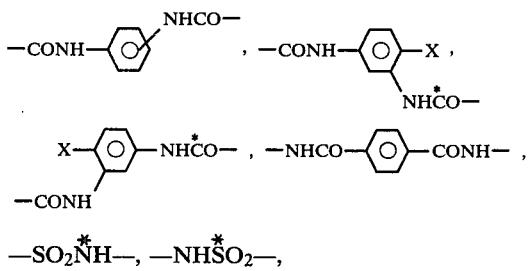

—SO$_2$*NH—, —N*HSO$_2$—,

—N(R$_8$)CO—(CH$_2$)$_m$CON(R$_8$)—, —N(R$_8$)CO—CH═CH—CON(R$_8$)—, —N(R$_8$)—CO—N(R$_8$)—, —CONHNHCO—, —CH$_2$CONHNHCOCH$_2$—, —CH═CH—CONHNHCO—CH═CH—,

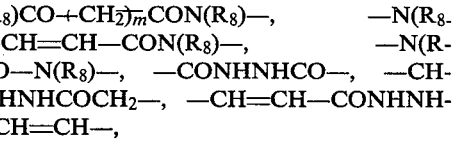

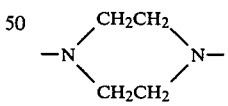 , 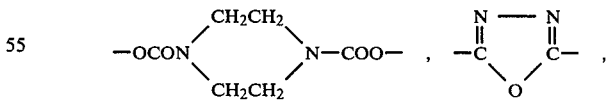

—O—CO—O—, —CO*O—, —O*CO—, —COCO—, —O—(CH$_2$)$_m$O—,

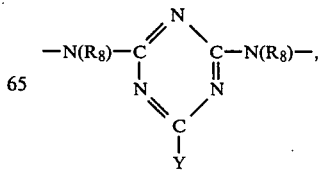

-continued

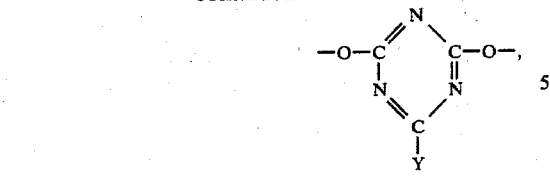

—CON($R_8$)($CH_2$)$_m$N($R_8$)CO—, —CON($R_8$)$+$CH$_2$$)_m$O$+$CH$_2$$)_m$N($R_8$)CO—, —CON($R_8$)$+$CH$_2$$)_m$N(CH$_3$)$+$CH$_2$$)_m$N($R_8$)CO—, —CON($R_8$)$+$CH$_2$$)_m$O$+$CH$_2$$)_m$O$+$CH$_2$$)_m$N($R_8$)CO— or —N═N—, wherein
each $R_8$ is independently hydrogen or n-$C_{1-4}$alkyl,
X is halo, n-$C_{1-4}$alkyl or n-$C_{1-4}$alkoxy,
Y is halo, —NHCH$_2$CH$_2$OH or —N(CH$_2$CH$_2$OH)$_2$,
each m is independently 1, 2, 3 or 4, and
the * indicates the atom of Z bound to the 1-position, wherein
each Ko is independently —N(CH$_3$)$_2$, —N$^⊕$(CH$_3$)$_3$ A$^⊖$, -N$^⊕$(CH$_3$)$_2$— —CH$_2$CH$_2$OH A$^⊖$ or

and
each A$^⊖$ is independently an anion,
with the proviso that the maximum number of Ko groups is 2.

2. A compound according to claim 1 wherein each halo is chloro.

3. A compound according to claim 1 wherein Z is a direct bond, straight or branched $C_{1-4}$-alkylene, —S—, —O—, —CH═CH—, —NH—, —NHĊO—, —COṄH—, —N(CH$_3$)—ĊO—, —COṄ(CH$_3$)—,

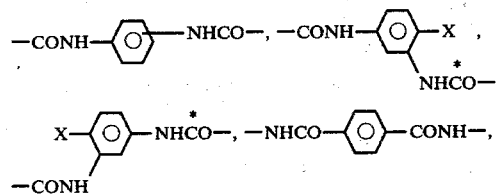

—N($R_8$)CO$+$CH$_2$$)_m$CON($R_8$)—, —N($R_8$)CO—CH═CH—CON($R_8$)—, —N($R_8$)—CO—N($R_8$)—, —CONHNHCO—,

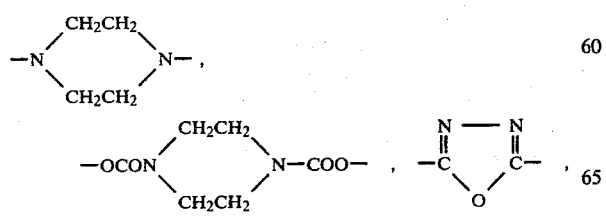

—COCO—,

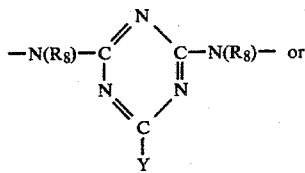

or —CON($R_8$)$+$CH$_2$$)_m$N($R_8$)CO—.

4. A compound according to claim 3 wherein Z is a direct bond, straight or branched $C_{1-4}$-alkylene, —S—, —O—, —CH═CH—, —NH—, —NHĊO—, —COṄH—, —N(CH$_3$)—ĊO—, —COṄ(CH$_3$)—,

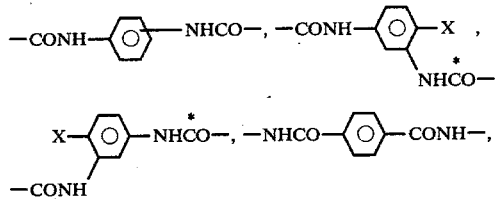

—N($R_8$)CO$+$CH$_2$$)_m$CON($R_8$)—, —N($R_8$)CO—CH═CH—CON($R_8$)—, —N($R_8$)—CO—N($R_8$)—, —CONHNHCO—, —COCO— or —CON($R_8$)$+$CH$_2$$)_m$N($R_8$)CO—.

5. A compound according to claim 3 wherein Z is

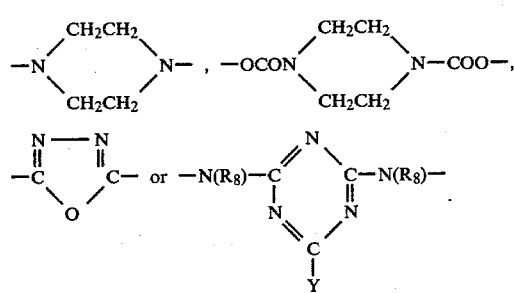

6. A compound according to claim 1 wherein R is hydrogen, $C_{1-4}$alkyl or $C_{2-4}$hydroxyalkyl the hydroxy group of which is on other than the α-carbon atom.

7. A compound according to claim 1 wherein R is di-($C_{1-4}$alkyl)amino.

8. A compound according to claim 1 wherein R is —(CH$_2$)$_n$—Ko.

9. A compound according to claim 1 wherein K is

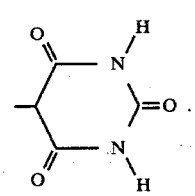

10. A compound according to claim 1 wherein K is

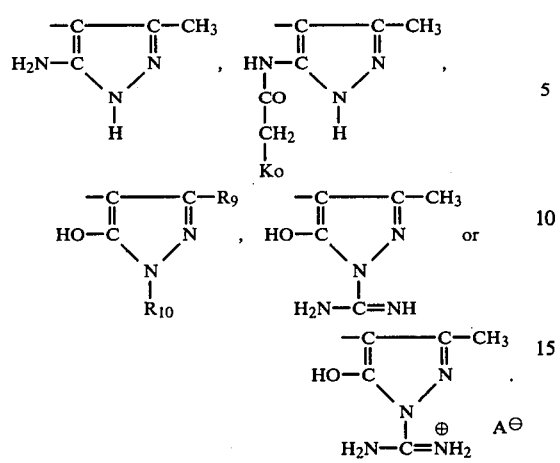

11. A compound according to claim 10 wherein K is

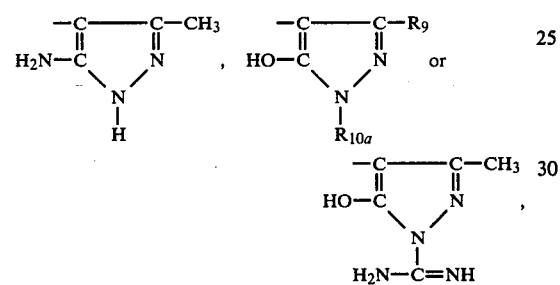

wherein $R_{10a}$ is hydrogen or phenyl.

12. A compound according to claim 10 wherein K is

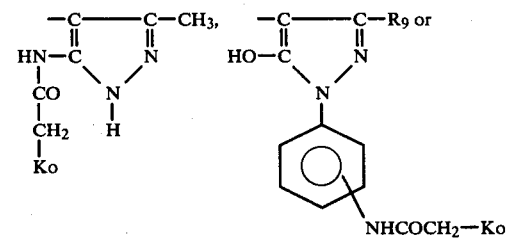

13. A compound according to claim 1 wherein K is

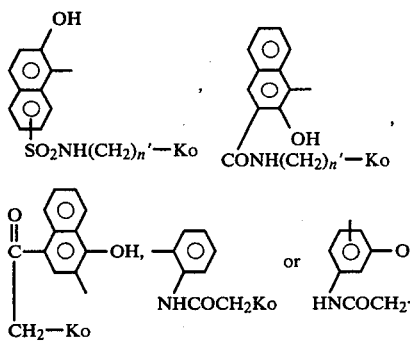

14. A compound according to claim 1 wherein K is

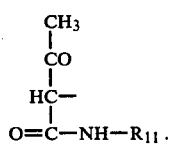

15. A compound according to claim 1 wherein K is

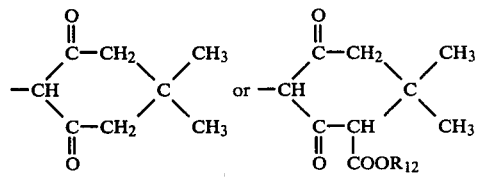

16. A compound according to claim 1 wherein each Ko is —N(CH$_3$)$_2$.

17. A compound according to claim 1 wherein each Ko is —N$^\oplus$(CH$_3$)$_3$ A$^\ominus$ or —N$^\oplus$(CH$_3$)$_2$CH$_2$CH$_2$OH A$^\ominus$.

18. A compound according to claim 1 wherein each Ko is

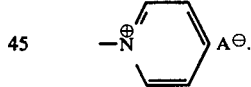

19. A compound according to claim 1 having the formula

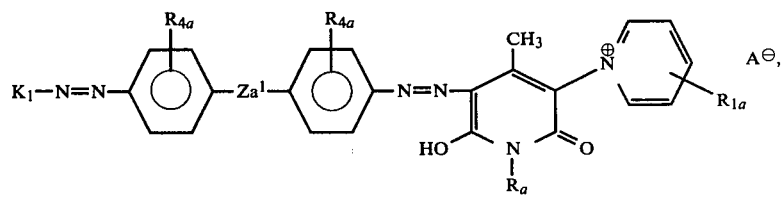

wherein K$_1$ is

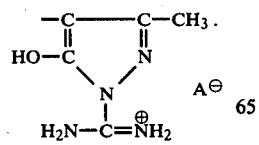

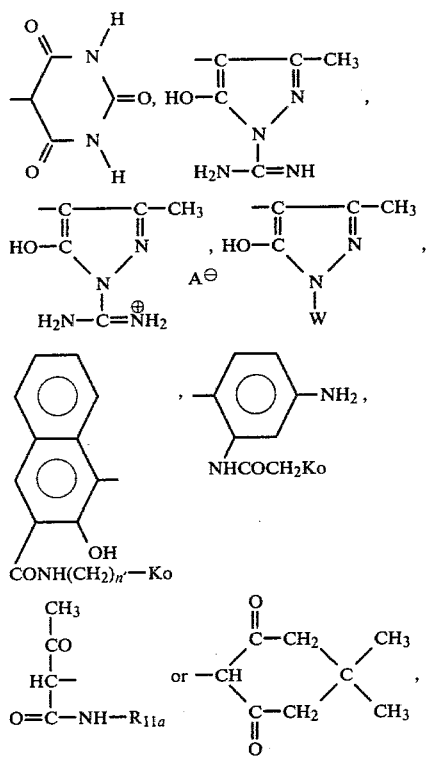

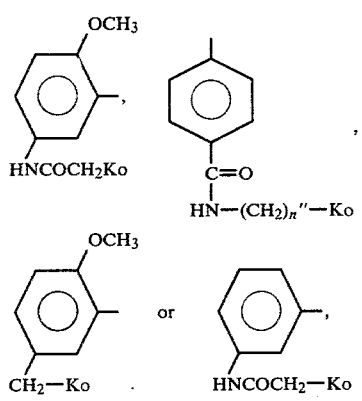

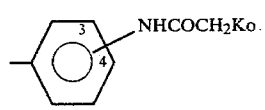

the —NHCOCH₂Ko substituent of which is in the 3- or 4-position, and
n″ is 2 or 3,
wherein
Ko is —N(CH₃)₂, —N⊕(CH₃)₃ A⊖, —N⊕(CH₃)₂CH₂—CH₂OH A⊖ or

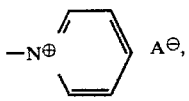

Ra is hydrogen, methyl, ethyl, 2-hydroxyethyl, 2-hydroxyisopropyl, —(CH₂)$_n$—N(CH₃)₂ or —(CH₂)$_n$—N(CH₃)₃ A⊖, wherein n is 2 or 3, R$_{1a}$ is hydrogen, methyl or methoxy, each R$_{4a}$ is hydrogen, chloro, methyl or methoxy, the two R$_{4a}$'s being the same, and Za is a direct bond, —S—, —O—, —CH=CH—, —NH—, —NHCO—, —CONH—, —N(CH₃)—CO—, —CON(CH₃)—,

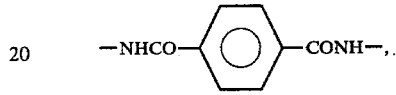

—CONHNHCO—,

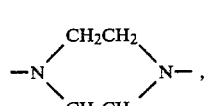

—COCO—, —NHCONH—,

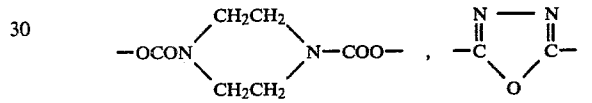

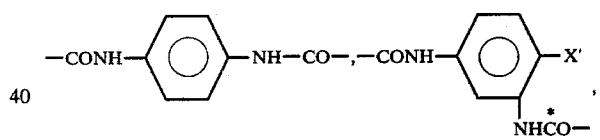

—NHCOCH₂CH₂CONH—, —NHCOCH=CHCONH—, —NHCO(CH₂)₄—CONH—; —N(CH₃)COCH₂CH₂CON(CH₃)—, —N(CH₃)COCH=CHCON(CH₃)—, —N(CH₃)CON(CH₃)—,

—CH₂—, —CH₂CH₂—, —(CH₂)₃—, —(CH₂)₄—, —CONH(CH₂)₂NHCO—, —CONH(CH₂)₃—NHCO— or —CONH(CH₂)₄NHCO—, wherein
X′ is hydrogen, chloro, methyl or methoxy,
Y′ is chloro, —NHCH₂CH₂OH or —N(CH₂CH₂OH)₂, and the * indicates the atom of Za bound to the 1-position,
wherein each $A^{\ominus}$ is independently an anion.

20. A compound according to claim 19 wherein Ra is hydrogen, methyl, ethyl, 2-hydroxyethyl or 2-hydroxyisopropyl.

21. A compound according to claim 19 wherein Ra is $-(CH_2)_n-N(CH_3)_2$.

22. A compound according to claim 19 wherein Ra is $-(CH_2)_n-N^{\oplus}(CH_3)_3\ A^{\ominus}$.

23. A compound according to claim 19 wheren $K_1$ is

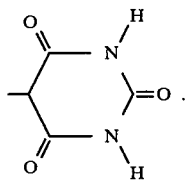

24. A compound according to claim 19 wherein $K_1$ is

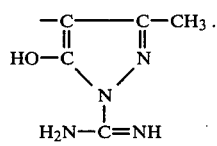

25. A compound according to claim 19 wherein $K_1$ is

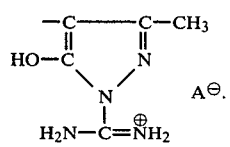

26. A compound according to claim 19 wherein $K_1$ is

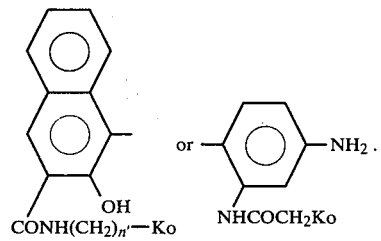

27. A compound according to claim 19 wherein $K_1$ is

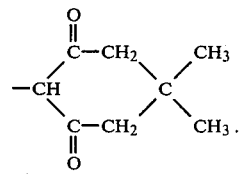

28. A compound according to claim 19 wherein $K_1$ is

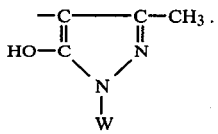

29. A compound according to claim 28 wherein W is hydrogen.

30. A compound according to claim 28 wherein $K_1$ is

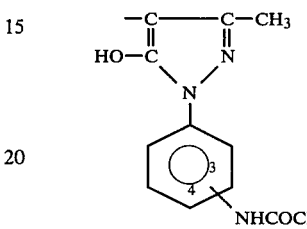

the $-NHCOCH_2-Ko$ substituent of which is in the 3- or 4-position.

31. A compound according to claim 19 wherein $K_1$ is

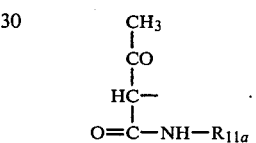

32. A compound according to claim 19 wherein Za is a direct bond, $-S-$, $-\overset{*}{O}-$, $-CH=CH-$, $-\overset{*}{NH}-$, $-NH\overset{*}{C}O-$, $-CO\overset{*}{N}H-$, $-N(CH_3)-\overset{*}{C}O-$, $-CO\overset{*}{N}(CH_3)-$,

$-CONHNHCO-$, $-COCO-$, $-NHCONH-$,

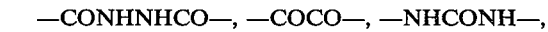

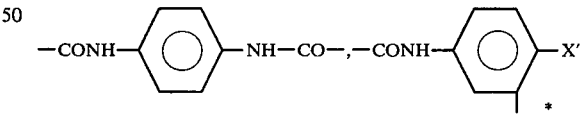

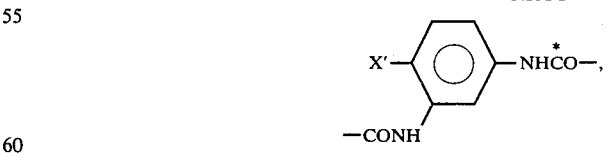

$-NHCOCH_2CH_2CONH-$, $-NHCOCH=CH-CONH-$, $-NHCO(CH_2)_4-CONH-$, $-N(CH_3)COCH_2CH_2CON(CH_3)-$, $-N(CH_3)COCH=CH-CON(CH_3)-$, $-N(CH_3)CON(CH_3)-$, $-CH_2-$, $-CH_2CH_2-$, $-(CH_2)_3-$, $-(CH_2)_4-$, $-CONH(CH_2)_2NHCO-$, $-CONH(CH_2)_3-NHCO-$ or $-CONH(CH_2)_4NHCO-$.

33. A compound according to claim 19 wherein Za is

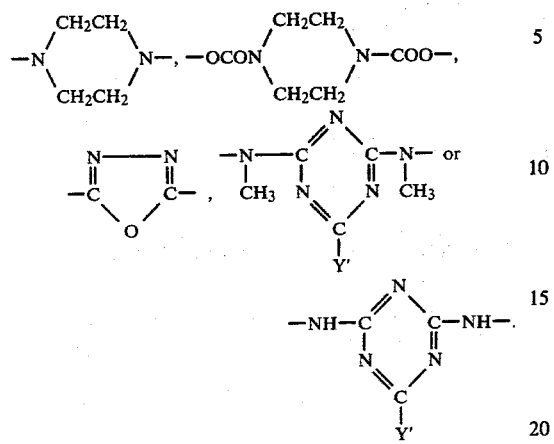

34. A compound according to claim 19 wherein Ko is —N(CH$_3$)$_2$.

35. A compound according to claim 19 wherein Ko is —N$^\oplus$(CH$_3$)$_3$ A$^\ominus$ or —N$^\oplus$(CH$_3$)$_2$CH$_2$CH$_2$OH A$^\ominus$.

36. A compound according to claim 19 wherein Ko is

37. A compound according to claim 19 having the formula

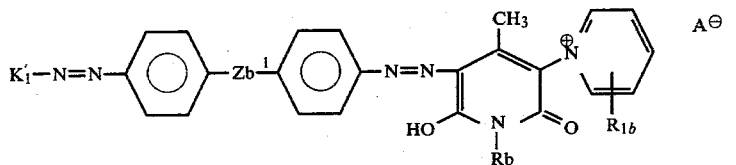

wherein K$_1'$ is

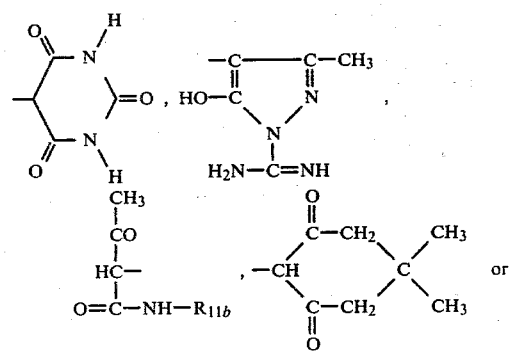

-continued

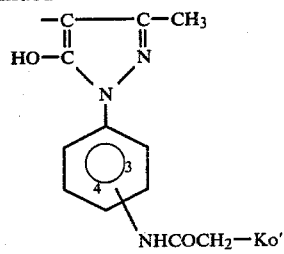

the —NHCOCH$_2$—Ko' group of which is in the 3- or 4-position, wherein R$_{11b}$ is

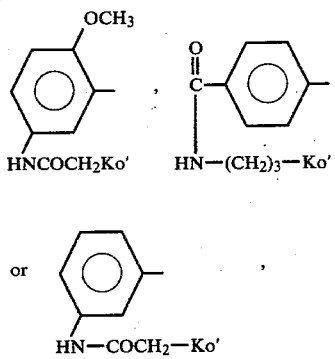

wherein Ko' is —N$^\oplus$(CH$_3$)$_3$ A$^\ominus$, —N(CH$_3$)$_2$CH$_2$CH$_2$OH A$^\ominus$ or

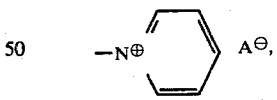

Rb is hydrogen, 2-hydroxyethyl, —(CH$_2$)$_3$—N(CH$_3$)$_2$ or —(CH$_2$)$_3$—N$^\oplus$(CH$_3$)$_3$ A$^\ominus$, R$_{1b}$ is hydrogen or methyl, and Zb is a direct bond, —$\overset{*}{N}$HCO—, —CO$\overset{*}{N}$H—, —N(CH$_3$)—$\overset{*}{C}$O—, —CO$\overset{*}{N}$(CH$_3$)—,

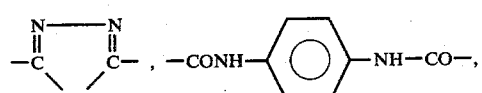

—NHCOCH$_2$CH$_2$CONH—, —NHCOCH=CHCONH—, —NHCO(CH$_2$)$_4$—CONH—, —N(CH$_3$)COCH$_2$CH$_2$CON(CH$_3$)—, —N(CH$_3$)COCH=CHCON(CH$_3$)—,

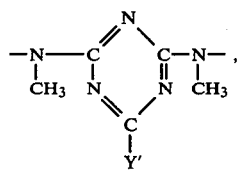

—CH₂CH₂— or —(CH₂)₄—,
wherein
Y' is chloro, —NHCH₂CH₂OH or —N(CH₂CH₂OH)₂, and
the * indicates the atom of Zb bound to the 1-position, wherein each A⊖ is independently an anion.

38. A compound according to claim 37 wherein Rb is hydrogen or 2-hydroxyethyl.

39. A compound according to claim 37 wherein Rb is —(CH₂)₃—N(CH₃)₂.

40. A compound according to claim 37 wherein Rb is —(CH₂)₃—N⊕(CH₃)₃ A⊖.

41. A compound according to claim 37 wherein K₁' is

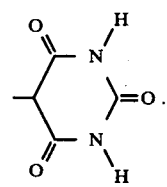

42. A compound according to claim 37 wherein K₁' is

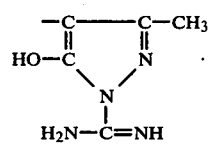

43. A compound according to claim 37 wherein K₁' is

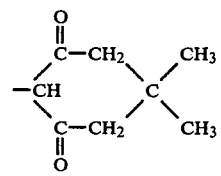

44. A compound according to claim 37 wherein K₁' is

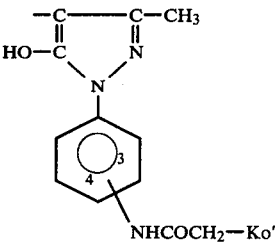

the —NHCOCH₂—Ko' substituent of which is in the 3- or 4-position.

45. A compound according to claim 37 wherein K₁' is

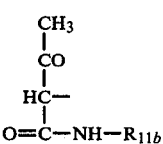

46. A compound according to claim 37 wherein Ko' is —N⊕(CH₃)₃ A⊖ or —N⊕(CH₃)₂CH₂CH₂OH A⊖.

47. A compound according to claim 37 wherein Ko' is

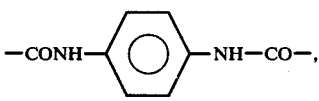

48. A compound according to claim 37 wherein Zb is a direct bond, —NH*CO—, —CONH*—, —N(CH₃)—*CO—, —CON*(CH₃)—,

—CONH—⟨⟩—NH—CO—,

—NHCOCH₂CH₂CONH—, —NHCOCH=CHCONH—, —NHCO(CH₂)₄—CONH—, —N(CH₃)COCH₂—CH₂CON(CH₃)—, —N(CH₃)COCH=CHCON(CH₃)—, —CH₂CH₂— or —(CH₂)₄.

49. A compound according to claim 37 wherein Zb is

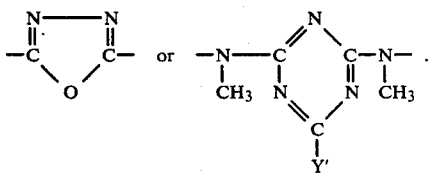

50. A compound according to claim 37 having the formula

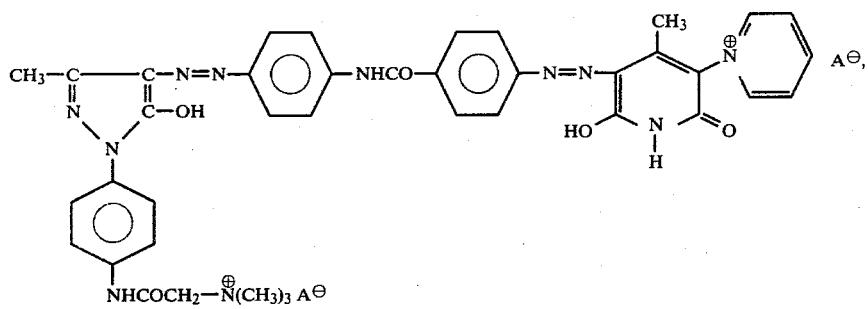
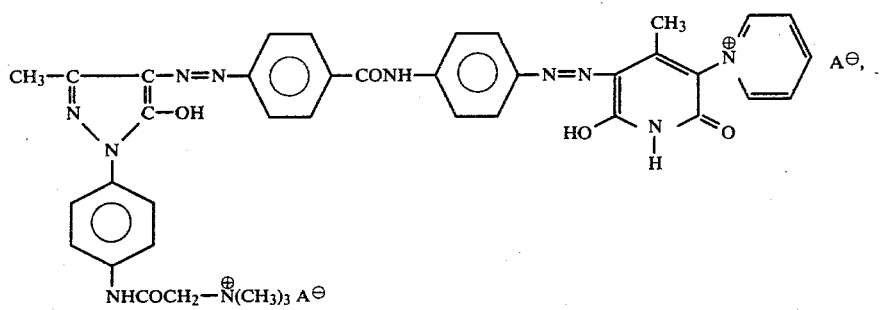
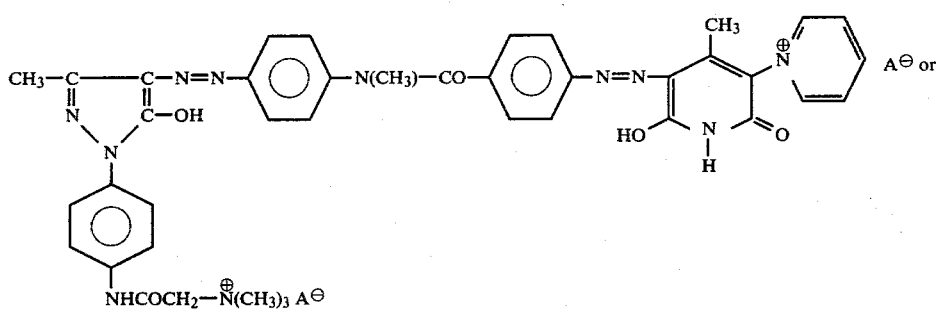
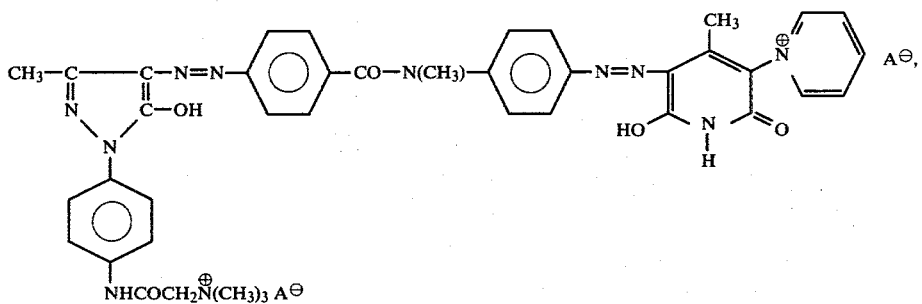
wherein each $A^{\ominus}$ is independently an anion.
51. A compound according to claim 19 having the formula

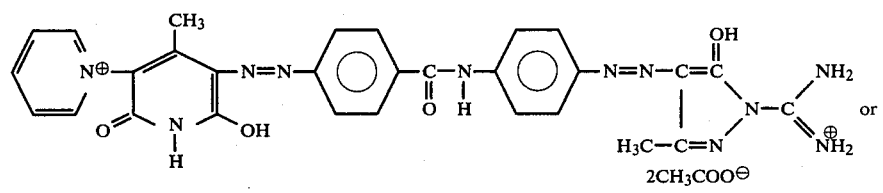 or
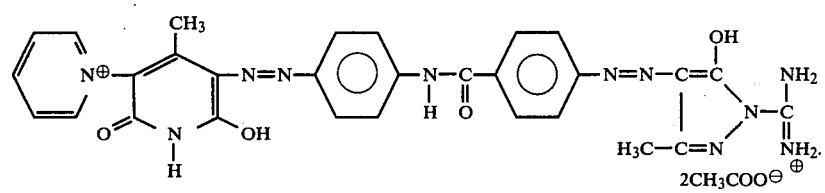
* * * * *